United States Patent Office 3,419,347
Patented Dec. 31, 1968

3,419,347
METHOD OF PREPARING ANHYDROUS
MAGNESIUM HALIDES
Ulrich W. Weissenberg, Midland, Mich., assignor to The
Dow Chemical Company, Midland, Mich., a corporation of Delaware
No Drawing. Filed Oct. 31, 1966, Ser. No. 590,519
10 Claims. (Cl. 23—91)

ABSTRACT OF THE DISCLOSURE

A method of preparing anhydrous magnesium halides by adding a substantially anhydrous monohydric alkanol of 2–5 carbon atoms to a methanol solution of the magnesium halide, trans-solvating by removal of at least part of the methanol, adding a cyclic ether of 5–6 carbon atoms and decomposing the diligand so formed.

---

This invention relates to a method for preparing anhydrous magnesium halides from alkali metal or ammonium carnallites or magnesium halides contaminated with ammonium halides, in which the halogen has an atomic weight above 35, and more particularly pertains to a method for making substantially anhydrous magnesium chlorides, bromides and iodides containing only small amounts of magnesium oxide and suitable for making magnesium metal by electrolysis, which method comprises adding a monohydric alkanol of 2–5 carbon atoms to a methanol solution of a magnesium halide, fractionally distilling from 50–100% of the methanol from the mixture, adding a cyclic aliphatic ether to the magnesium halide-higher alkanol mixture, separating the complex formed and decomposing the complex to obtain a magnesium halide in a high state of purity.

Anhydrous magnesium halides of the type defined, containing only small amounts of water or magnesium oxide are very difficult to prepare because each forms hydrates, alcoholates, etherates and other complexes which tend to react by splitting out a halide from the magnesium compound thereby forming magnesium oxide or oxyhalide in amounts such that the halide is unsuitable for the preparation of magnesium by the electrolytic process.

Among the procedures proposed for making substantially anhydrous magnesium halides is one in which dry hydrogen halide gas is passed through a heated hydrate of the corresponding magnesium halide. The use of hydrogen halides in the procedure creates severe corrosion conditions, so that only a very limited number of expensive materials can be employed for constructing equipment which can be used in such process.

Another process employs a step-wise heating of hydrated ammonium carnallite to remove the water and some $NH_4Cl$ and then to break up the $MgCl_2 \cdot NH_4Cl$ complex at temperatures above 330° C. This process requires special techniques to prevent premature condensation of vaporized $NH_4Cl$ and it also creates the problem of recovering the corrosive $NH_4Cl$, so that it can be either reused for preparing additional ammonium carnallite or disposed of otherwise.

I have found that the if a substantially anhydrous monohydric alkanol having 2–5 carbon atoms is added to a methanol solution of a magnesium halide and the methanol is fractionally distilled from the mixture, the higher alkanol replaces the methanol as a ligand in the Mg halide alcoholate. On adding a cyclic ether such as tetrahydrofuran, or 1,3 or 1,4-dioxane, a mixed diligand which is sparingly soluble in the system and which contains the higher alkanol and the cyclic ether is formed. This diligand can be heated to desolvate the alkanol preferentially. Thereafter, the cyclic ether-magnesium halide complex is decomposed at a temperature of 200–300° C., preferably under vacuum, without appreciable dehalogenation of the magnesium halide, to yield a substantially anhydrous, and substantially magnesium oxide free magnesium halide.

The amount of higher monohydric alkanol of 2–5 carbon atoms should be at least equimolar with the molar amount of magnesium halide and preferably should be used in amounts of at least 2–3 moles per mole of magnesium halide.

The amount of unsubstituted, saturated cyclic ether having 5 to 6 atoms in the ring at least one of which is an oxygen atom, should preferably be used in an amount greater than that needed to complex with the magnesium halide. Usually the molar quantity of the cyclic ether should be at least 2 times that of the magnesium halide.

It is unobvious that the Mg halide-hexamethylate can be trans-solvated with a higher alkanol without splitting out of any substantial amounts of halogen from the magnesium salt. In my copending patent application Ser. No. 590,521 filed Oct. 31, 1966, I have shown that when a cyclic ether of the type defined is added to a methanol solution of a magnesium halide salt and the complex which separates is decomposed by heat, the Mg halide which remains contains from 1.6 to about 2.0% MgO. When ethanol is substituted for methanol, a magnesium halide containing no more than about .5% MgO is produced by the procedure there described. However, the low solubility of magnesium halides in ethanol requires operations with relatively dilute solutions, in contrast to those where saturated solutions of magnesium halide in methanol are used. With the process of this invention it is possible to begin initially with the higher concentrations of magnesium halides in methanol, trans-solvate with a higher monohydric alkanol and form the cyclic ether-higher alcohol complex which is thereafter decomposed to form a magnesium halide having a very low magnesium oxide and a very low water content.

In the example which follows, which is intended to illustrate but not to limit the invention, parts are by weight unless otherwise designated.

To about 500 ml. absolute methanol in a 1-liter balloon flask were added 42.4 g. of an impure $MgCl_2$ analyzing 81.6% $MgCl_2$, 14.6% $NH_4Cl$, 0.6% MgO and 2.3% $H_2O$. The mixture underwent an immediate exothermic reaction which caused the methanol to boil vigorously. On cooling, the methanol solution was filtered into a 2-liter balloon flask and washed with two 50-ml. portions of absolute $CH_3OH$. The dried, undissolved residue weighed 0.7 g. Then 600 ml. of anhydrous ethanol were added to the methanol mixture and 300 ml. of alcohol were distilled at 64.8–65.8° C. At this point an additional 60 ml. of anhydrous ethanol were added and distillation continued at 68.5–69.5° C. until 500 ml. of liquid were recovered. A third cut of 500 ml. distillate was recovered at 69.5–71° C. The mixture was cooled and 650 ml. of 1,4-dioxane added. The mixture was stirred overnight. Thereafter 600 ml. of liquid were removed at a temperature of 75–91.5° C. The mixture remaining in the flask contained dioxane and a dioxane-ethanol diligand of $MgCl_2$. Approximately 310 ml. of liquid were distilled at 99–170° C. A total of 66.9 g. of the complex were recovered at this point. 58.7 g. of the complex were heated to 200–208° C. at a vacuum of about 10 mm. for four hours to decompose the complex. The residue weighed 30.4 g. It was found to contain .38% MgO, .18% $H_2O$, 0.51% carbon and the remainder was $MgCl_2$.

Repeating this example with methanol solutions of other magnesium halides in which the halogen has an atomic weight of at least 35 and using monohydric alkanols of 3–5 carbon atoms, such as n-propanol, isopropanol, n-butanol, butanol-2, isobutanol, t-butanol and the pentanols, give equally good results. Tetrahydrofuran or 1,3-dioxane can be used in place of the 1,4-dioxane of the example. If desired, a mixture of $C_2$–$C_5$-alcohols in any proportion can be used for trans-solvating the magnesium halide methylate. Also, a mixture of cyclic ethers described above can be employed in place of any single ether.

I claim:

1. A method for preparing substantially anhydrous magnesium halides in which the halogen atom has an atomic weight of at least 35, comprising adding to a methanol solution of said magnesium halide a sufficient amount of a higher monohydric alkanol to trans-solvate said magnesium halide, removing from the mixture 50–100% of the methanol by distillation, adding sufficient saturated cyclic unsubstituted cyclic ether having 5 to 6 atoms and from 1 to 2 oxygen atoms in the ring, to form a diligand with said magnesium halide which is only sparingly soluble in the liquid, separating the said diligand from the mixture and decomposing the diligand to recover a magnesium halide having a low water and low MgO content.

2. The method of claim 1 in which the higher alkanol is ethanol.

3. The method of claim 1 in which the alkanol is isopropanol.

4. The method of claim 1 in which the alkanol is isobutanol.

5. The method of claim 1 in which the alkanol is pentanol-2.

6. The method of claim 1 in which the Mg salt is $MgCl_2$.

7. The method of claim 1 in which the Mg salt is $MgBr_2$.

8. The method of claim 1 in which the Mg salt is $MgCl_2$, the higher alkanol is ethanol and the cyclic ether is 1,4-dioxane.

9. The method of claim 1 in which the Mg salt is $MgBr_2$, the higher alkanol is ethanol and the cyclic ether is 1,4-dioxane.

10. The method of claim 1 in which the Mg salt is $MgCl_2$, the higher alcohol is ethanol and the cyclic ether is tetrahydrofuran.

References Cited

UNITED STATES PATENTS

| | | | |
|---|---|---|---|
| 3,241,915 | 3/1966 | Moolenaar | 23—91 |
| 3,341,282 | 9/1967 | Kimberlin et al. | 23—91 |
| 3,350,412 | 10/1967 | Potrafke et al. | 260—346.1 |
| 3,357,800 | 12/1967 | Gaska | 23—91 XR |

FOREIGN PATENTS 631,288  11/1961  Canada.

EARL C. THOMAS, *Primary Examiner.*

EDWARD STERN, *Assistant Examiner.*

U.S. Cl. X.R.

260—340.6, 346.1